April 19, 1932.   R. A. BRUCE ET AL   1,855,093
STEERING AILERON OR ELEVATOR MECHANISM FOR AIRCRAFT OR OTHER CRAFT
Filed Oct. 9, 1931
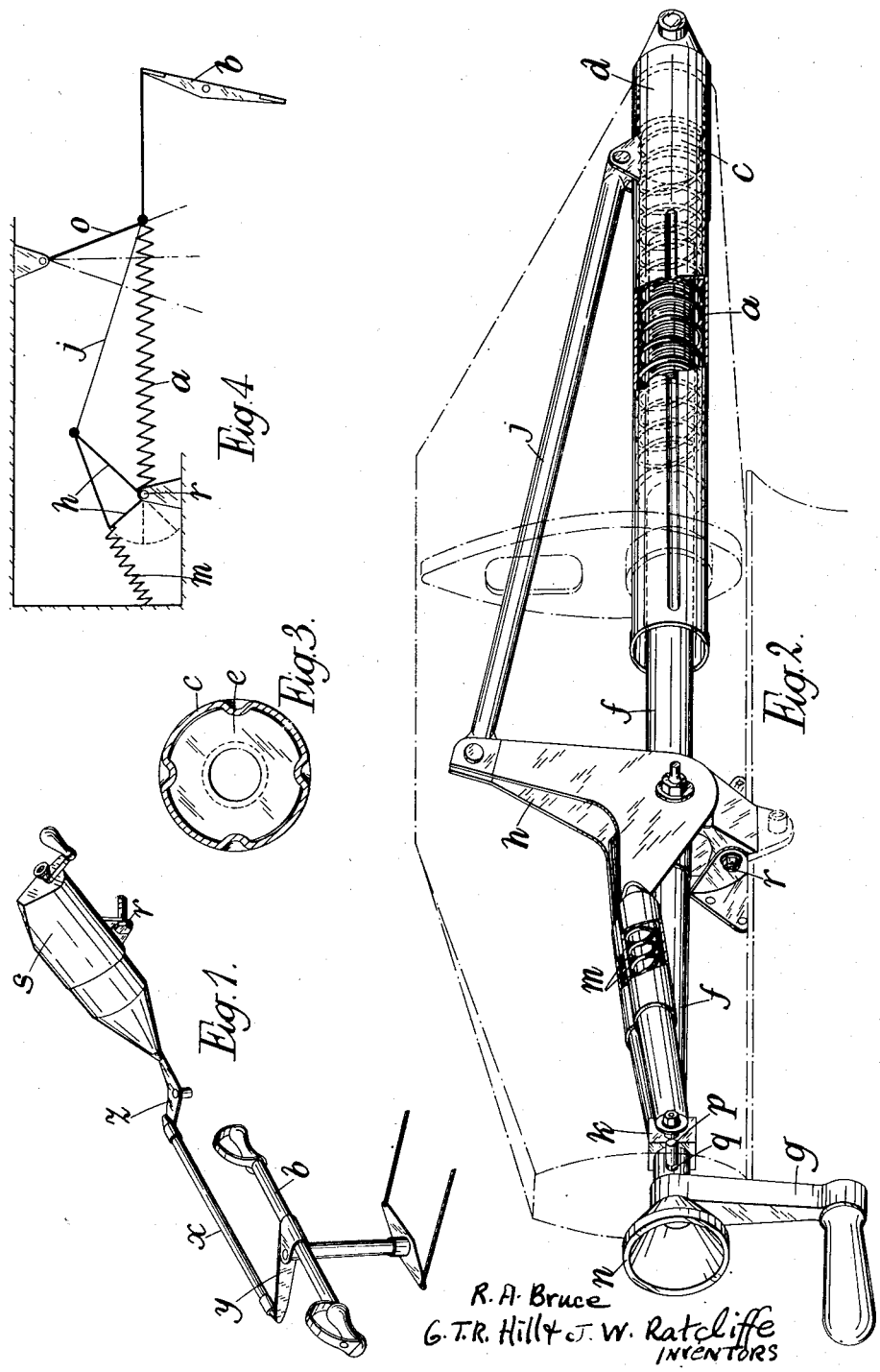
R. A. Bruce
G. T. R. Hill & J. W. Ratcliffe
INVENTORS
By: Marks & Clerk
Attys.

Patented Apr. 19, 1932

1,855,093

UNITED STATES PATENT OFFICE

ROBERT ARTHUR BRUCE, GEOFFREY TERENCE ROLAND HILL, AND JOHN WALKER RATCLIFFE, OF YEOVIL, ENGLAND, ASSIGNORS TO PETTERS, LIMITED, OF YEOVIL, ENGLAND

STEERING AILERON OR ELEVATOR MECHANISM FOR AIRCRAFT OR OTHER CRAFT

Application filed October 9, 1931, Serial No. 567,904, and in Great Britain August 5, 1930.

This invention relates to spring devices for use in steering aileron or elevator mechanism for aircraft or other craft.

In cases where one engine of, say, a multi-engined aeroplane ceases to operate for any reason the pilot is able to maintain a straight course only by applying a considerable pressure to one end of the rudder bar or to one of the steering pedals. This involves considerable fatigue and difficulty in controlling the aeroplane.

The main object of the present invention is to provide mechanism which may be of compact, self-contained form for association with the steering mechanism of aircraft or other craft in order to remove the above difficulty. Similarly the pilot may be relieved of fatiguing loads arising in the aileron or elevator controlling mechanism of aircraft or other craft.

Spring devices of the type embodying main and auxiliary or relief spring members are known wherein the restoring force instead of being proportional to the displacement remains substantially constant or varies at any required rate over the range of movement utilized, an example of such devices being described in British specification No. 190,560.

The invention consists in the provision, in a spring mechanism of the type described employed in connection with the control of aircraft or other craft, of means for applying any desired degree of biasing force to the control mechanism in either direction throughout the whole range of movement.

The invention further consists in spring mechanism as set forth above, wherein said biasing force is applied by displacing the fixed abutment of a main or primary spring.

The invention further consists in spring mechanism as set forth above, wherein the force exerted by a secondary or relief spring member may be adjusted during operation in order to vary its compensating effect and thus cause the total force provided by the mechanism to increase or decrease with displacement as required.

The invention further consists in spring mechanism as set forth above, formed as a self-contained unit for attachment to a fixed part of a craft and having its operative part connected to any desired part of the control mechanism thereof.

The invention further consists in spring mechanism as set forth above, including in combination a main or primary spring, a secondary or relief spring, connecting means between said springs whereby force applied to the operative end of said main spring is divided between both springs throughout the major portion of the displacement of said main spring and an adjustable connection between said operative end and the control mechanism capable of actuation during operation of the mechanism.

The invention further consists in spring mechanism as set forth above, wherein said connecting means between said springs comprise a bell crank lever pivoted about a fixed axis and a tie between the operative end and said bell crank lever.

The invention also consists in spring devices for steering aileron or elevator mechanism of aircraft or other craft substantially as hereinafter described with reference to the accompanying drawings.

Referring to the accompanying diagrammatic drawings:—

Figure 1 illustrates one manner in which the present invention may be applied to the steering mechanism of aircraft.

Figure 2 is a perspective view broken away to show the construction of a convenient form of apparatus in accordance with the present invention.

Figure 3 is an elevational view of a detail.

Figure 4 is a diagram illustrating the action of the device in Figures 1-3.

In carrying the invention into effect in one convenient form illustrated by way of example in Figure 1 as applied to the rudder steering mechanism of an aeroplane, we connect the steering rudder bar $b$ through suitable links $x$ and arms $y$, $z$ to a telescopic spring device $s$, part of which is pivotally connected at $r$ to a rigid part of the aircraft structure. This telescopic spring device which is illustrated in Figures 2 and 3 embodies a primary spring member $a$ and a secondary or relief spring member, the latter being conveniently formed of two springs $m, m$, acting in parallel. The primary spring member $a$ is formed as a helical spring adapted to operate either in tension or in compression contained within a tube $c$ to one end $d$ of which it is rigidly secured. This tube is longitudinally corrugated as shown in Figure 3, the corrugations engaging notches formed in the flange of a nut $e$ adapted to be secured rigidly to the other end of the said spring. Engaging the thread of the nut is an externally threaded tube $f$ mounted in trunnion bearings upon a rigid fixed part of the aircraft structure, this tube being extended and furnished with an operating handle $g$.

Mounted coaxially with the axis of said trunnion bearing is a bell crank lever $h$, one end of which is connected by a tie $j$ to the corrugated tube member. The other end of this bell crank lever is connected to an abutment block $k$ slidably mounted on the externally threaded tube $f$ by two secondary or relief springs $m, m$ acting only in compression. This abutment block bears against a pair of transverse pins $p$, one of which is seen in Figure 2. These pins are carried by a block (not shown) axially slidable within the tube $f$, the holes $q$ through which the pins project being elongated as shown in Figure 2.

The internal block is adapted to be moved axially by a screw furnished with a handwheel $n$ so as to adjust the position of the pins, thus varying the force exerted by the relief springs $m, m$.

The disposition of the bell crank lever $h$ is such that the relief springs $m, m$ are in line with the arm of the bell crank lever to which they are connected when the rudder bar occupies its central position under normal flying conditions, the bell crank lever being rocked in opposite directions so as to neutralize the change in effort exerted by the main spring member as the rudder bar is rocked in opposite directions from its mid position.

According to the diagram shown in Figure 4, similar references are applied to equivalent members, the end of the main spring $a$ connected to a rudder bar $b$ being guided in a substantially straight line path by a pivoted arm $o$. In this diagram means for adjustment of the fixed abutment of the spring $a$ and of the abutment of spring $m$ remote from the point $r$ are omitted for simplicity.

In operation, in normal circumstances, that is with all engines operating, the aeroplane is steered by seesaw movement of the rudder bar $b$, the arrangement of main spring $a$ and secondary springs $m, m$ being such that throughout the full range of movement in either direction the resultant force due to the added action of primary and secondary springs is substantially zero in its action on the rudder. If however it be desired that the stabilizing force should increase appreciably with the displacement of the rudder bar from its central position and thus assist the pilot to overcome the aerodynamic loads on the rudder, then it is merely necessary to increase the compression of the secondary or relief springs $m, m$.

Assuming now the starboard engine to cut out of operation, then the rudder bar requires to be rotated in a clockwise direction in plan and maintained in this position against the aerodynamic load on the rudder in order to counteract the non-uniform propulsive effort. The handle $g$ attached to the externally threaded tube, however, is now rotated so as to move the nut $l$ away from the trunnion bearing axis. This in turn carries with it the main spring and the axially corrugated tube enclosing it. As the main spring is thus progressively compressed, the force originally provided by the pilot's foot is progressively transferred to the spring mechanism and if desired the pilot's foot may in this way be entirely relieved of load in steady straight flight with starboard engine stopped.

Steering movement to right and left of this new datum position is, however, unaffected. Similarly, should the port engine fail, the handle $g$ is rotated to move the nut towards the trunnion bearing axis, thus applying tension to the main spring member of sufficient extent to relieve the pilot.

It will be understood that the example described above is given by way of example only and may be modified. The telescopic spring device $s$ described above is preferably formed as a self-contained unit as shown which may thus be applied to any convenient position in connection with steering aileron or elevating gear.

If desired, however, two separate self-contained units may be associated respectively with the two opposite ends of a rudder or other control bar or with two separate control pedals or the like.

Having now described our invention, what we claim as new and desire to secure by Letters Patent is:—

1. A spring device for controlling a movement embodying a main spring coacting with a fixed abutment and with a point partaking of the said movement, an auxiliary spring acting upon a rigid abutment and upon said point and means for adjusting the position of one end of the main spring in relation to its coacting member independent of any movement of the rigid abutment of the auxiliary spring in order to enable any desired degree of biasing force to be applied in either direction throughout the whole range of said movement to be controlled.

2. A spring device for controlling a movement embodying a main spring coacting with a fixed abutment and with a point partaking of the said movement, an auxiliary spring acting upon a rigid abutment and upon said point and means for adjusting the position of the end of the main spring coacting with the said fixed abutment in relation to said fixed abutment independently of any movement of the rigid abutment of the auxiliary spring in order to enable any desired degree of biasing force to be applied in either direction throughout the whole range of said movement to be controlled.

3. A spring device as claimed in claim 1 including means for adjusting the force exerted by the auxiliary spring.

4. A spring device as claimed in claim 1 including means for adjusting during operation the force exerted by the auxiliary spring.

5. A spring device as claimed in claim 1 formed as a self-contained unit for attachment to a fixed part of a craft and having its operative part connected to any desired part of the control mechanism thereof.

6. A spring device as claimed in claim 1 including in combination a main or primary spring, a secondary or relief spring, connecting means between said springs serving to divide force applied to the operative end of said main spring between both springs throughout the major portion of the displacement of said main spring and an adjustable connection between said operative end and said point capable of actuation during operation of the mechanism.

7. A spring device as claimed in claim 1 including in combination a main spring and a relief spring connecting means between said springs comprising a lever pivoted about a fixed axis and a tie between the said point and said lever.

In testimony whereof we have signed our names to this specification.

ROBERT ARTHUR BRUCE.
    GEOFFREY TERENCE ROLAND HILL.
    JOHN WALKER RATCLIFFE.